No. 702,964. Patented June 24, 1902.
W. S. JONES.
SWINGING GATE.
(Application filed Feb. 13, 1902.)
(No Model.) 2 Sheets—Sheet 1.

Witnesses
O. J. Bell
C. H. Bradley

William S. Jones Inventor
by Taber & Whitman Co.
Attorneys

No. 702,964. Patented June 24, 1902.
W. S. JONES.
SWINGING GATE.
(Application filed Feb. 13, 1902.)
(No Model.) 2 Sheets—Sheet 2.
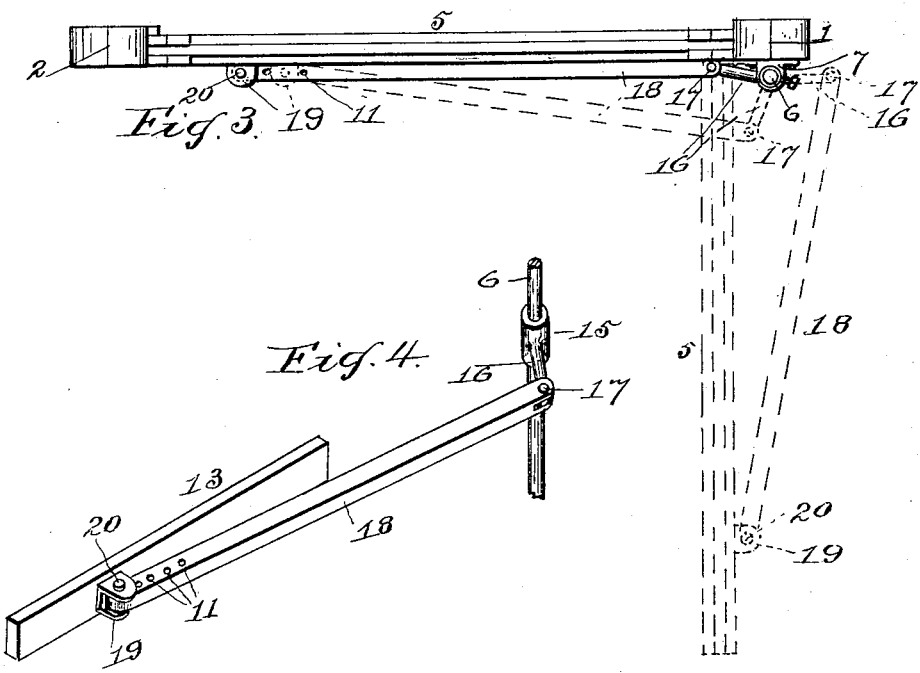
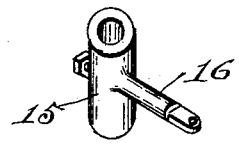
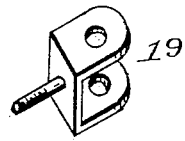
Witnesses
C. T. Belt.
C. W. Bradley
Inventor
William S. Jones.
by Taber & Whitman Co
Attorneys

UNITED STATES PATENT OFFICE.

WILLIAM S. JONES, OF MARSHALL, MISSOURI.

SWINGING GATE.

SPECIFICATION forming part of Letters Patent No. 702,964, dated June 24, 1902.

Application filed February 13, 1902. Serial No. 93,965. (No model.)

*To all whom it may concern:*

Be it known that I, WILLIAM S. JONES, a citizen of the United States, residing at Marshall, in the county of Saline and State of Missouri, have invented certain new and useful Improvements in Swinging Gates; and I do hereby declare the following to be a full, clear, and exact description of the invention, such as will enable others skilled in the art to which it appertains to make and use the same.

This invention relates to swinging gates, and particularly to the class of hand-opening gates; and the invention consists in a shaft-and-reel swinging gate having novel and peculiar connections between the shaft and spring-controlled latch-bars to automatically lock and unlock the gate with the closing and opening of the gate.

The invention further consists in a reel-shaft having one or more adjustable arms, to which is fulcrumed one end of a lever or levers, the other end of the latter being pivoted to a sliding latch or bar or bars to operate the latter automatically with the opening and closing of the gate.

The advantages accruing from my improved mechanism for automatically locking and unlocking the gate upon opening and closing the gate will be revealed in the specification and claims to follow.

Figure 1:
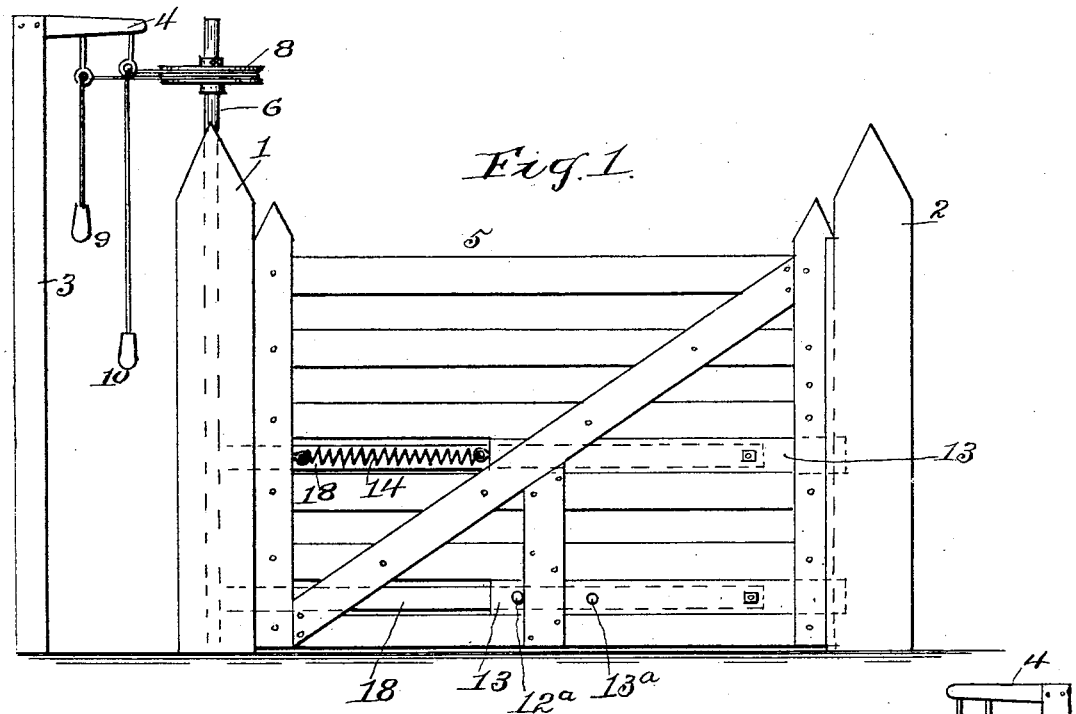
Figure 2:
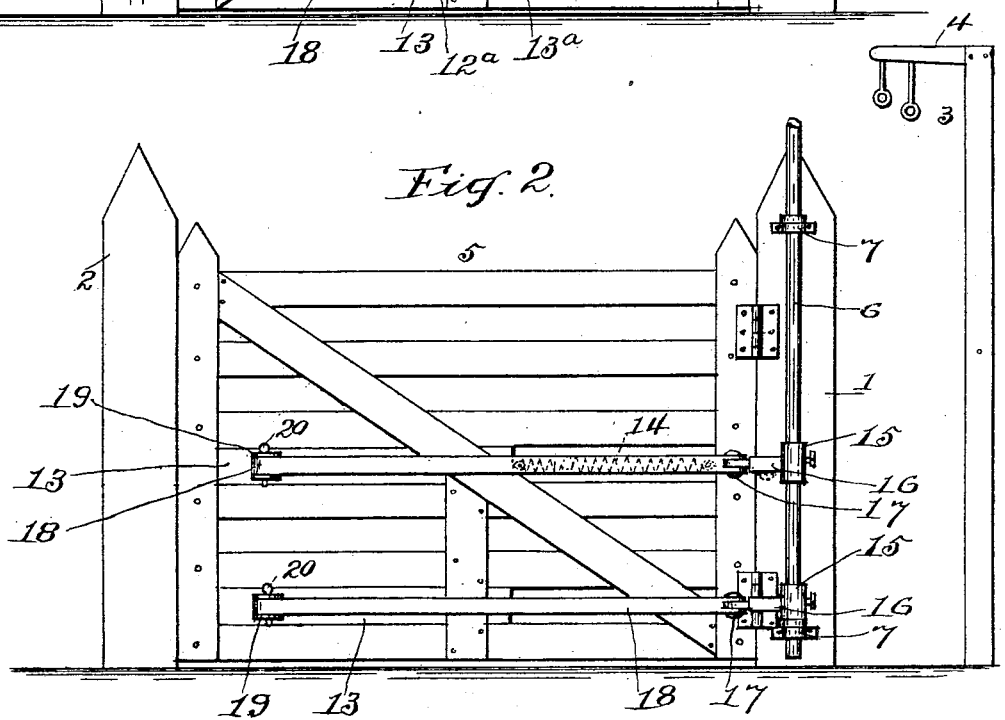

In the accompanying drawings, forming part of this application, Figure 1 is an elevation looking at one side of the gate in closed and locked position. Fig. 2 is a similar view looking at the other side of the gate. Fig. 3 is a top view of the gate with the reel and cords removed and showing the unlocked and open position of the gate in dotted lines. Fig. 4 is a detail perspective view of the reel-shaft, partly broken away, showing the connection between the adjustable arms and the latch-levers. Fig. 5 is a detail perspective view of one of the U-shaped brackets. Fig. 6 is a perspective view of one of the sleeves.

The same numeral references denote the same parts throughout the several views of the drawings.

The hinge-post 1 and the latch-post 2 are of the usual construction, and the cable or cord suspending posts 3, having arms 4, are of well-known character. The gate 5 is of panel form; but it may be of any other form applicable to my invention.

The shaft 6 is journaled in bearings 7 of the gate-post 1 and extends above the latter, where it is provided with a vertically-adjustable reel 8. The reel is provided with two cables or cords having one of their ends 9 and 10 suspended at one side of the gate and the other of their ends (not shown) suspended at the other side of the gate. These cords are suitably secured to and wrapped around the reel, or only one long cord may be used, wrapped several times around the reel without being otherwise connected to the reel, so as to operate the latter without slipping. The gate is provided with one or more slidable latch or locking bars 13, having stops $12^a$ $13^a$, two of such bars, as shown, being preferable, one or both of which may be provided with a retracting-spring; but in this case only one spiral spring 14, attached to the upper bar, is employed, and said bars may or may not be connected together.

To the reel-shaft 6 is secured in vertical adjustable position sleeves 15, having fulcrumed arms 16, projecting at right angles from the shaft. Each arm 16 has fulcrumed to it at 17 one end of a lever 18, and the other ends of said levers are provided with a series of holes 11, whereby the levers are adjustably secured in U-shaped brackets 19, attached to the latch or locking bars 13 by removable pins 20. This and the sleeve arrangement provide for two separate lengthwise adjustments of the levers, and the latter are adjusted vertically, according to the location of the locking-bars on the gate, by moving the arm-sleeves vertically on the reel-shaft.

It is obvious that the gate is opened and closed by pulling the cord or cable ends, which pull to open the gate will automatically operate the levers through the shaft and its sleeve-arms and retract the latch or locking-bars to the stop $12^a$, where they are held in retracted position by the spring until the gate is closed, and a continued pull on the closing-cord will turn the shaft and throw the arms toward the gate until the locking-bars engage the post 2 and are stopped by the stop $13^a$. The bars are pushed into said stopped position by the levers, the fulcrum end of the latter being forced over the center of the arc described by the fulcrum-point of the sleeve-arms until the levers are stopped by coming in contact with the side of the gate, whereby they are prevented from further inward movement, and the lengthwise pressure of the levers on the bars will hold the latter in said stopped position and lock the gate. If it should be desired to close the gate without locking it, the continued pull on the closing-cord above referred to is omitted and the arms will stand in the same position as when the gate is open, thus permitting the gate to be opened and closed without operating the said arms and levers.

It will be seen that when the gate is closed and locked the spring and levers are extended and when the gate is unlocked or open these elements are retracted.

I do not wish to be understood as limiting myself to any particular shape or form of locking-bars, fulcrum-arms, or levers, to the number of these parts, nor to any special character of material in their composition. Neither do I wish to be understood as confining myself to a reel-operated shaft, but reserve to myself the right to operate the shaft by any other suitable means.

Having thus described my invention, what I claim as new, and desire to secure by Letters Patent, is—

1. The combination, with a swinging gate, latches slidable therein, and a vertical revoluble shaft, of the sleeves having projecting arms and adjustable on the shaft, and the levers fulcrumed to the arms and connected to the latches.

2. The combination, with a swinging gate, spring-controlled latches slidable thereon, and a revoluble shaft, of the sleeves adjustable on the shaft and having projecting arms, and the levers having one end fulcrumed to the arms and the other end adjustably connected to the latches.

3. The combination, with a swinging gate, slidable latches, and springs to retract the latches and control the movement of the latter, of a revoluble shaft, arms projecting from the shaft, and levers connecting the latches with the arms, to automatically operate the gate and the latches.

4. The combination, with the latches having stops, brackets on the latches, and springs for retracting the latches, of a revoluble shaft, arms adjustable on and projecting from the shaft, and the levers fulcrumed to the arms and adjustably connected to the said brackets, whereby the height and throw of the arms, and reach of the levers may be varied.

In testimony whereof I affix my signature in presence of two witnesses.

WILLIAM S. JONES.

Witnesses:
R. B. RUFF,
D. K. MILLER.